(12) United States Patent
Choi et al.

(10) Patent No.: US 9,447,833 B2
(45) Date of Patent: Sep. 20, 2016

(54) DYNAMIC DAMPER

(71) Applicant: DAEHEUNG RUBBER & TECHNOLOGY CO., LTD, Gyeongsangnam-do (KR)

(72) Inventors: Sang Hyun Choi, Gyeongsangnam-do (KR); Hyun Chul Sohn, Gyeongsangnam-do (KR); Shin Won Lee, Gyeongsangnam-do (KR)

(73) Assignee: DAEHEUNG RUBBER & TECHNOLOGY CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 14/629,521

(22) Filed: Feb. 24, 2015

(65) Prior Publication Data

US 2016/0169314 A1  Jun. 16, 2016

(30) Foreign Application Priority Data

Dec. 16, 2014 (KR) .................. 10-2014-0181656

(51) Int. Cl.
*F16F 7/10* (2006.01)
*F16F 7/108* (2006.01)

(52) U.S. Cl.
CPC .................... *F16F 7/108* (2013.01)

(58) Field of Classification Search
CPC ............ F16F 7/08; F16F 7/087; F16F 7/104; F16F 7/108
USPC ......... 188/378, 379, 380; 267/137; 248/560, 248/568, 570, 636
See application file for complete search history.

(56) References Cited

U.S. PATENT DOCUMENTS

| 4,697,781 A | 10/1987 | Hamano et al. |
| 5,056,763 A | 10/1991 | Hamada et al. |
| 5,135,204 A | 8/1992 | Funahashi |
| 6,682,060 B2 * | 1/2004 | Kato ................... F16F 15/1442 267/141 |

FOREIGN PATENT DOCUMENTS

| DE | 202014005767 | * | 7/2014 | ............. F16F 7/108 |
| DE | 102013103110 | * | 10/2014 | ............. F16F 7/108 |
| EP | 0410941 A1 | * | 1/1991 | ............. F16F 7/108 |
| EP | 0428949 A1 | * | 5/1991 | ............. F16F 7/108 |
| FR | 2149919 A5 | * | 3/1973 | ......... B27B 17/0033 |

* cited by examiner

*Primary Examiner* — Thomas J Williams
(74) *Attorney, Agent, or Firm* — Wenderoth, Lind & Ponack, L.L.P.

(57) ABSTRACT

Disclosed herein is a dynamic damper that can reduce vibrations with respect to not only the axial direction but also the radial direction of a connector connected to a vibration generating source.

5 Claims, 4 Drawing Sheets

DYNAMIC DAMPER

BACKGROUND OF THE INVENTION

1. Field of the Invention

The present invention relates to a dynamic damper that can reduce both axial vibration and radial vibration of a vibration generating source.

2. Description of the Related Art

Generally, while vehicles are operated, vibration and noise are caused from a variety of elements such as an engine, a power transmission system, a muffler unit, etc. Dynamic dampers are mainly used as a means for preventing or restricting generation of such vibration.

As shown in FIG. 1, such a dynamic damper typically includes: a mass 50 that is a heavy body; a bracket 51 for use in mounting the dynamic damper to a vibration generation source (not show); and an elastic member 52 that is made of rubber having a predetermined dynamic stiffness and is integrally formed between the mass 50 and the bracket 51 thereby forming a single body by curing adhesion.

However, the dynamic damper illustrated in FIG. 1 can reduce only one-directional vibration.

Meanwhile, although conventional dynamic dampers capable of reducing both axial vibration and radial vibration have been introduced, these conventional dynamic dampers are problematic in that the production cost is high because of a large number of parts and a complex structure.

SUMMARY OF THE INVENTION

Accordingly, the present invention has been made keeping in mind the above problems occurring in the prior art, and an object of the present invention is to provide a dynamic damper that is designed such that a mass includes an inner protrusion provided with first and second inclined surfaces, and an elastic body includes first and second vibration reducers that are oriented respectively perpendicular to the first and second inclined surfaces so that the same characteristic ratio can be given with respect to both axial vibration and radial vibration, thereby making it possible to reduce both the axial vibration and the radial vibration.

In order to accomplish the above object, the present invention provides a dynamic damper, including: a connector including an axial part extending in an axial direction; and a damping unit including an internal pipe having an inner circumferential surface coupled to an outer circumferential surface of the axial part, a tubular mass having a concentric structure with the internal pipe, the mass being disposed at a position spaced apart from the internal pipe, and an elastic body bonded at an inner end thereof to the internal pipe and bonded at an outer end thereof to the mass. An inner protrusion protrudes from an inner circumferential surface of the mass toward the internal pipe. A first inclined surface is formed on a first axial end of the inner protrusion and is inclined outward with respect to the internal pipe. A second inclined surface is formed on a second axial end of the inner protrusion and is inclined outward with respect to the internal pipe. The elastic body includes a first vibration reducer extending from the first inclined surface toward the internal pipe, the first vibration reducer being oriented perpendicular to the first inclined surface, and a second vibration reducer extending from the second inclined surface toward the internal pipe, the second vibration reducer being oriented perpendicular to the second inclined surface.

The first inclined surface of the mass may be inclined to the internal pipe by 45°, and the second inclined surface of the mass may be inclined to the internal pipe by 45°. The first vibration reducer of the elastic body may be inclined to the internal pipe by 45°, and the second vibration reducer of the elastic body may be inclined to the internal pipe by 45°.

A plurality of first hollow spaces may be axially formed in the first vibration reducer and spaced apart from each other at regular intervals, and a plurality of second hollow spaces may be axially formed in the second vibration reducer and spaced apart from each other at regular intervals. The first hollow spaces and the second hollow spaces may alternate with each other in a circumferential direction of the internal pipe. The inner protrusion may have a parallel surface between the first inclined surface and the second inclined surface. The parallel surface may be oriented parallel to the internal pipe. An auxiliary hollow space may be formed between the parallel surface of the inner protrusion and the internal pipe. The auxiliary hollow space may extend from the first hollow spaces or the second hollow spaces.

The connector may further include a radial part radially extending from an end of the axial part. An axial-dynamic-stiffness adjustment part may be provided on an outer portion of the elastic body bonded to the mass. The axial-dynamic-stiffness adjustment part may be brought into contact with and compressed by the radial part of the connector.

The connector may further include a radial part radially extending from an end of the axial part. A dust cover may be provided on an outer portion of the elastic body bonded to the mass. The dust cover may be brought into contact with the radial part of the connector.

The damping unit may have the same characteristic ratio with respect to both the axial vibration and the radial vibration.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
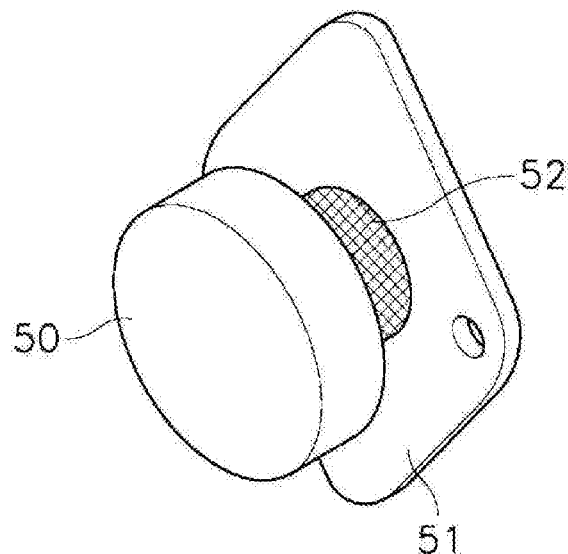
FIG. 1 is a perspective view of a dynamic damper according to a conventional technique.

Hereinafter, embodiments of the present invention will be described in detail with reference to the attached drawings, such that those skilled in the art can easily implement the present invention. The present invention is realized in various manners and is not limited to the following embodiment. Furthermore, in the drawings, portions that are not related to the present invention are omitted to explain the present invention more clearly. Reference should be made to the drawings, in which similar reference numerals are used throughout the different drawings to designate similar components.

In the specification, when the explanatory phrase "a part includes a component" is used, this means that the part may further include other components rather than excluding the components unless special explanation is given.

Figure 2:
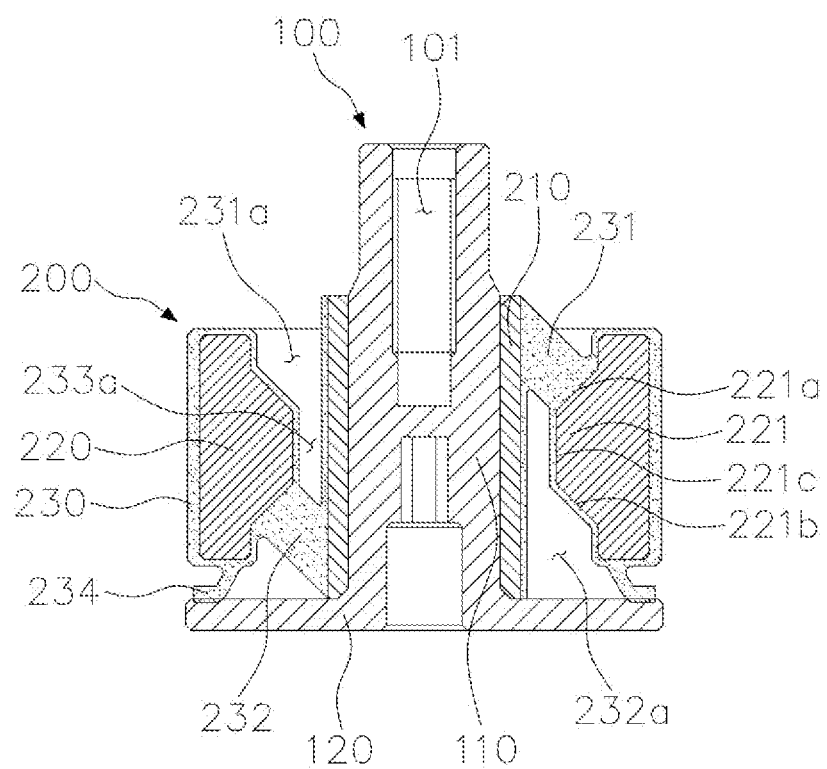
FIG. 2 is a sectional view illustrating a dynamic damper according to a first embodiment of the present invention.
Figure 3:
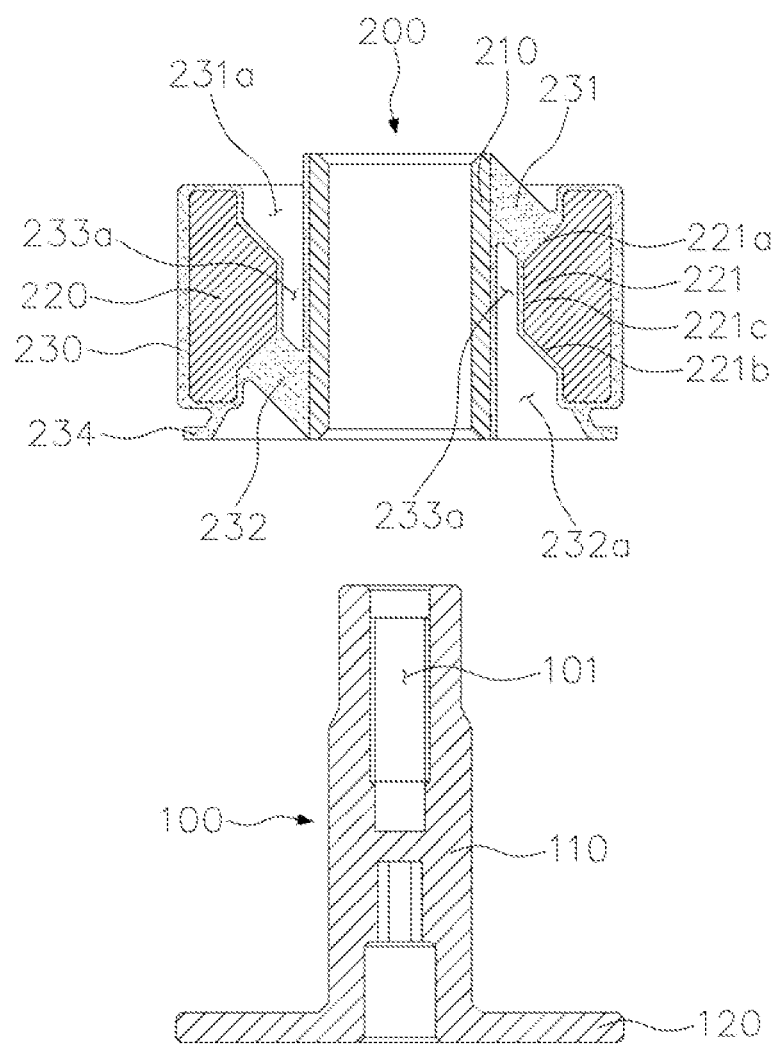
FIG. 3 is an exploded sectional view of the dynamic damper of FIG. 2.
Figure 4:
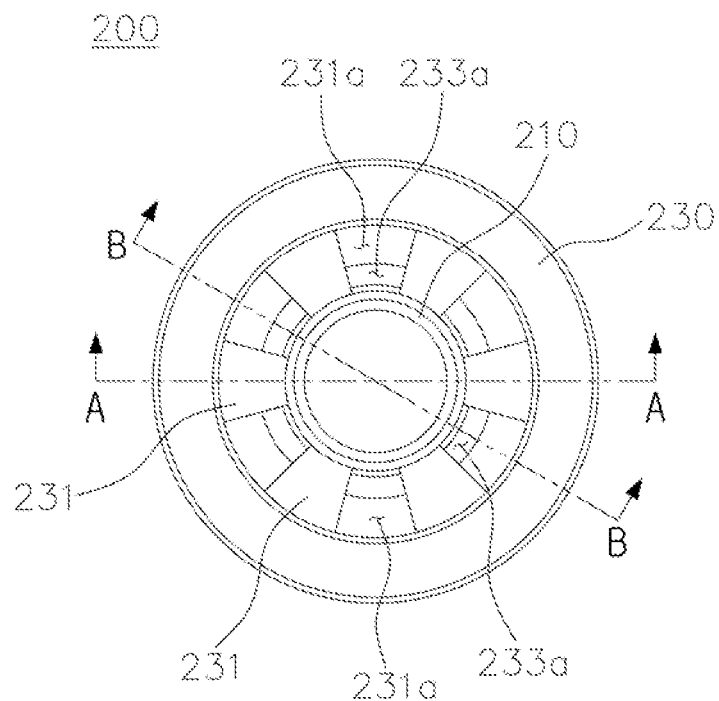
FIG. 4 is a plan view illustrating a damping unit of FIG. 3.
Figure 5:
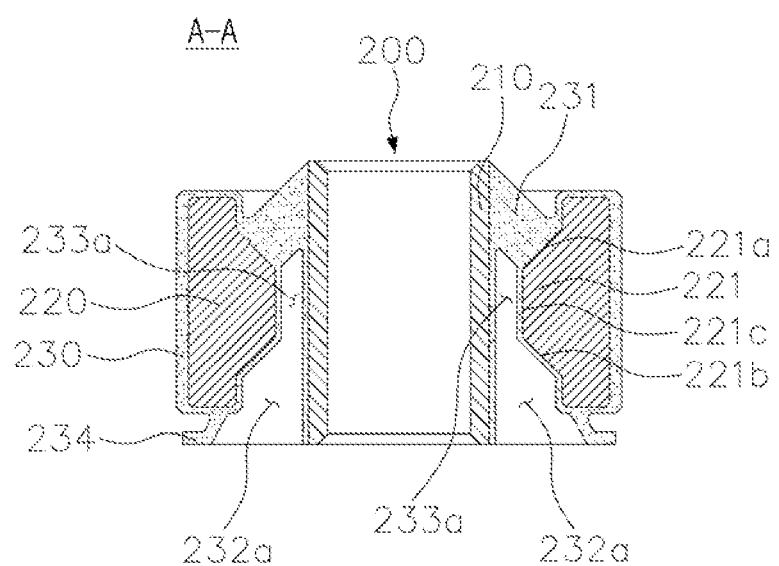
FIG. 5 is a sectional view taken along line A-A of FIG. 4.
Figure 6:
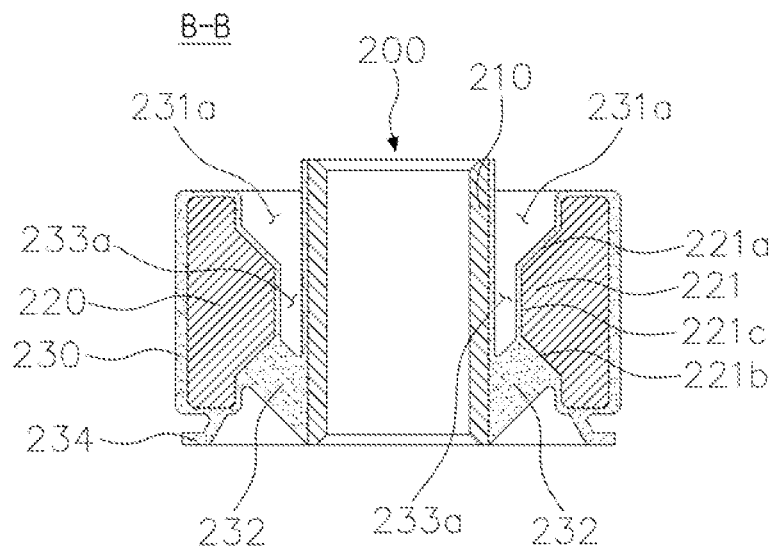
FIG. 6 is a sectional view taken along line B-B of FIG. 4.

FIG. 2 is a sectional view illustrating a dynamic damper according to a first embodiment of the present invention. FIG. 3 is an exploded sectional view of the dynamic damper of FIG. 2. FIG. 4 is a plan view illustrating a damping unit of FIG. 3. FIG. 5 is a sectional view taken along line A-A of FIG. 4. FIG. 6 is a sectional view taken along line B-B of FIG. 4.

The dynamic damper according to the first embodiment includes a connector 100 and a damping unit 200. The connector 100 and the damping unit 200 are manufactured through separate processes, as shown in FIG. 3, and then are axially coupled to each other, thus forming the dynamic damper, as shown in FIG. 2.

The connector 100 is made of metal and is coupled to a vibration generating source of a vehicle by a bolt or the like. For this, the connector 100 has a bolt hole 101 into which a connection bolt can be inserted.

The connector 100 includes an axial part 110 and a radial part 120.

The axial part 110 has a cylindrical shape and extends a predetermined length in the axial direction. The radial part 120 radially extends from an end of the axial part 110.

In the first embodiment, the bolt hole 101 is formed along the center of the axial part 110. The radial part 120 has a disk shape having an opening therein.

Of course, the internal shape of the connector 100 can be modified in a variety of ways.

The damping unit 200 includes an internal pipe 210 made of metal, a mass 220 made of metal, and an elastic body 230.

The internal pipe 210 is force-fitted over an outer circumferential surface of the axial part 110 of the connector 100.

The mass 220 is tubular having a concentric structure with the internal pipe 210 and is disposed at a position spaced apart from the internal pipe 210.

With regard to the shape of the mass 220, as shown in FIG. 2, etc., an outer circumferential surface of the mass 220 has a cylindrical shape, and an inner circumferential surface of the mass 220 is configured such that a medial portion thereof with respect to the axial direction protrudes inward.

To connect the mass 220 to the internal pipe 210, the elastic body 230 is provided in such a way that an inner end of the elastic body 230 is connected to the internal pipe 210 and an outer end thereof is connected to the mass 220.

An inner protrusion 221 protrudes from the medial portion of the inner circumferential surface of the mass 220 inward, that is, toward the internal pipe 210.

In this embodiment, the inner protrusion 221 protruding toward the internal pipe 210 has a trapezoidal cross-section. Inclined outward and upward with respect to the internal pipe 210, a first inclined surface 221a is formed on a first axial end of the inner protrusion 221. Inclined outward and downward with respect to the internal pipe 210, a second inclined surface 221b is formed on a second axial end of the inner protrusion 221.

Each of the first and second inclined surfaces 221a and 221b is inclined to the internal pipe 210 by 45°.

Oriented parallel to the internal pipe 210, a parallel surface 221c is formed between the first inclined surface 221a and the second inclined surface 221b.

The inner end of the elastic body 230 is bonded to the internal pipe 210 by curing adhesion. The outer end of the elastic body 230 is bonded to the mass 220 by curing adhesion. The elastic body 230 has a predetermined dynamic stiffness.

The elastic body 230 according to the first embodiment uses a first vibration reducer 231 and a second vibration reducer 232, which will be explained later herein, to reduce vibrations of the connector 100.

The first vibration reducer 231 extends from the first inclined surface 221a of the mass 220 toward the internal pipe 210 and is oriented perpendicular to the first inclined surface 221a. Thus, the first vibration reducer 231 is inclined to the internal pipe 210 by 45°.

The second vibration reducer 232 extends from the second inclined surface 221b of the mass 220 toward the internal pipe 210 and is oriented perpendicular to the second inclined surface 221b. Thus, the second vibration reducer 232 is inclined to the internal pipe 210 by 45°.

A plurality of first hollow spaces 231a are axially formed in the first vibration reducer 231 and disposed at positions spaced apart from each other at regular intervals.

A plurality of second hollow space 232a are axially formed in the second vibration reducer 232 and disposed at positions spaced apart from each other at regular intervals.

Furthermore, the first hollow spaces 231a and the second hollow spaces 232a alternate with each other in the circumferential direction of the internal pipe 210.

Consequently, if the first vibration reducer 231 is present at a predetermined position on a first axial end of the elastic body 230, the second hollow space 232a is formed at the same axial position in a second axial end of the elastic body 230. If the first hollow space 231a is formed at a predetermined position in the first axial end of the elastic body 230, the second vibration reducer 232 is present at the same axial position in the second axial end of the elastic body 230.

Furthermore, extending from the first hollow spaces 231a or the second hollow spaces 232a, an auxiliary hollow space 233a is formed between the parallel surface 221c of the inner protrusion 221 and the internal pipe 210.

In other words, each first hollow space 231a extends downward and communicates with the auxiliary hollow space 233a, and each second hollow space 232a extends upward and communicates with the auxiliary hollow space 233a.

As stated above, in this embodiment, the first and second hollow spaces 231a and 232a formed in the first and second vibration reducers 231 and 232 alternate with each other with respect to the circumferential direction so that the auxiliary hollow space 233a is formed in the elastic body 230.

Meanwhile, in the first embodiment, a dust cover 234 is provided on an outer portion of the elastic body 230 that is bonded to the mass 220. The dust cover 234 comes into contact with the radial part 120 and functions to prevent penetration of foreign substances such as dust.

The operation of the first embodiment having the above-mentioned construction will be explained below.

The connector 100 and the damping unit 200 are separately manufactured. Subsequently, the connector 100 and the damping unit 200 are integrally coupled to each other by force-fitting.

That is, the internal pipe 210 of the damping unit 200 is forcibly fitted over the axial part 110 of the connector 100. When the force-fitting is completed, the dust cover 234 of the elastic body 230 comes into contact with the radial part 120 of the connector 100.

The connector 100 of the dynamic damper manufactured through the above-mentioned process is coupled to the vibration generating source of the vehicle by a bolt or the like.

When the connector 100 vibrates due to vibration of the vibration generating source, the mass 220 having a predetermined mass (m) vibrates with the elastic body 230 having a predetermined stiffness (spring constant: k) and a predetermined damping coefficient c, thus reducing the vibration of the vibration generating source.

Here, the first vibration reducer 231 and the second vibration reducer 232 convert both axial vibration and radial vibration of the connector 100 into diagonal vibration and transmit it to the mass 220. That is, the first and second vibration reducers 231 and 232 of the elastic body 230 make the mass 220 act as a means for applying mass (m) with respect to not only the axial vibration of the connector 100 but also the radial vibration thereof.

The auxiliary hollow space 233a is configured to be empty given that the distance between the parallel surface 221c of the mass 220 and the internal pipe 210 is comparatively short. That is, the auxiliary hollow space 233a is designed such that the vibration-reducing operation of the damper of the first embodiment can be mainly conducted by the first and second vibration reducers 231 and 232 of the elastic body 300. According to a manufacturing method or a design method, the auxiliary hollow space 233a may be designed to be comparatively small.

By virtue of the above-mentioned structure, the damping unit 200 according to the first embodiment has the same characteristic ratio with respect to both the axial vibration and the radial vibration. To make the damping unit 200 have the same characteristic ratio, the inner protrusion 221 protrudes inward from the medial portion of the inner circumferential surface of the mass 220, and the first vibration reducer 231 and the second vibration reducer 232 that are respectively formed on the first and second inclined surfaces 221a and 221b of the inner protrusion 221 have a symmetric structure.

Hereinafter, a second embodiment of the present invention will be explained.

Figure 7:
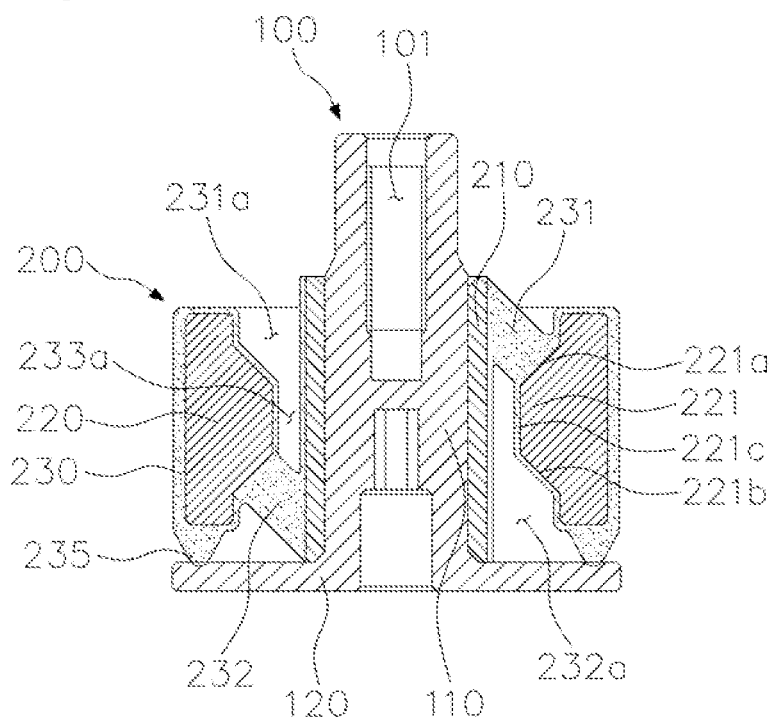
FIG. 7 is a sectional view illustrating a dynamic damper according to a second embodiment of the present invention.

FIG. 7 is a sectional view illustrating a dynamic damper according to the second embodiment of the present invention.

The general construction of the dynamic damper according to the second embodiment, except that an axial-dynamic-stiffness adjustment part 235 is provided in lieu of the dust cover 234 of the first embodiment, is the same as that of the first embodiment.

In detail, the axial-dynamic-stiffness adjustment part 235 protrudes toward the radial part 120 of the connector 100 from the outer portion of the elastic body 230 bonded to the mass 220.

In more detail, protruding from the outer portion of the elastic body 230 toward the radial part 120 of the connector 100, the axial-dynamic-stiffness adjustment part 235 is brought into contact with the radial part 120 of the connector 100 and is lightly compressed in the axial direction when the internal pipe 210 is forcibly fitted over the axial part 110 of the connector 100. Depending on the degree of compression, the axial-dynamic-stiffness adjustment part 235 adjusts the dynamic stiffness of the elastic body 230 with respect to axial vibration.

Meanwhile, the dynamic damper according to the second embodiment can be used particularly for reducing vibration of a brake caliper of a vehicle.

As described above, in a dynamic damper according to the present invention, a mass includes an inner protrusion provided with first and second inclined surfaces. An elastic body includes first and second vibration reducers that are oriented respectively perpendicular to the first and second inclined surfaces. The dynamic damper having the above construction is designed such that the same characteristic ratio is given with respect to both the axial vibration and the radial vibration, thereby making it possible to reduce both the axial vibration and the radial vibration.

Although the embodiments of the present invention have been disclosed, those skilled in the art will appreciate that various modifications, additions and substitutions are possible, without departing from the scope and spirit of the invention as disclosed in the accompanying claims. Therefore, it should be understood that the embodiments are only for illustrative purposes and does not limit the bounds of the present invention. For instance, components that have been illustrated as being integrated with each other may be implemented in a separate structure, and components which have been illustrated as being separately provided may be provided in an integrated structure.

Therefore, it is intended that the bounds of the present invention are defined by the accompanying claims, and various modifications, additions and substitutions, which can be derived from the meaning, scope and equivalent concepts of the accompanying claims, fall within the bounds of the present invention.

What is claimed is:

1. A dynamic damper, comprising:
    a connector including an axial part extending in an axial direction; and
    a damping unit comprising:
        an internal pipe having an inner circumferential surface coupled to an outer circumferential surface of the axial part;
        a tubular mass having a concentric structure with the internal pipe, the mass being disposed at a position spaced apart from the internal pipe; and
        an elastic body bonded at an inner end thereof to the internal pipe and bonded at an outer end thereof to the mass,
    wherein an inner protrusion protrudes from an inner circumferential surface of the mass toward the internal pipe, with a first inclined surface formed on a first axial end of the inner protrusion, the first inclined surface being inclined outward with respect to the internal pipe, and with a second inclined surface formed on a second axial end of the inner protrusion, the second inclined surface being inclined outward with respect to the internal pipe, and
    the elastic body comprises a first vibration reducer extending from the first inclined surface toward the internal pipe, the first vibration reducer being oriented perpendicular to the first inclined surface, and a second vibration reducer extending from the second inclined surface toward the internal pipe, the second vibration reducer being oriented perpendicular to the second inclined surface.

2. The dynamic damper as set forth in claim 1, wherein the first inclined surface of the mass is inclined to the internal pipe by 45°, and the second inclined surface of the mass is inclined to the internal pipe by 45°, and
    the first vibration reducer of the elastic body is inclined to the internal pipe by 45°, and the second vibration reducer of the elastic body is inclined to the internal pipe by 45°.

3. The dynamic damper as set forth in claim 1, wherein a plurality of first hollow spaces is axially formed in the first vibration reducer and spaced apart from each other at regular intervals, and a plurality of second hollow spaces is axially formed in the second vibration reducer and spaced apart from each other at regular intervals, wherein the first hollow spaces and the second hollow spaces alternate with each other in a circumferential direction of the internal pipe, and the inner protrusion has a parallel surface between the first inclined surface and the second inclined surface, the parallel surface being oriented parallel to the internal pipe, wherein an auxiliary hollow space is formed between the parallel surface of the inner protrusion and the internal pipe, the auxiliary hollow space extending from the first hollow spaces or the second hollow spaces.

4. The dynamic damper as set forth in claim 1, wherein the connector further includes a radial part radially extending from an end of the axial part, wherein an axial-dynamic-stiffness adjustment part is provided on an outer portion of the elastic body bonded to the mass, the axial-dynamic-stiffness adjustment part being brought into contact with and compressed by the radial part of the connector.

5. The dynamic damper as set forth in claim 1, wherein the connector further includes a radial part radially extending from an end of the axial part, wherein a dust cover is provided on an outer portion of the elastic body bonded to the mass, the dust cover being brought into contact with the radial part of the connector.

\* \* \* \* \*